(12) United States Patent
Goleski et al.

(10) Patent No.: US 8,617,021 B1
(45) Date of Patent: Dec. 31, 2013

(54) MULTIPLE SPEED TRANSMISSION

(75) Inventors: Gregory Daniel Goleski, Rochester Hills, MI (US); Steven Gerald Thomas, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/566,510

(22) Filed: Aug. 3, 2012

(51) Int. Cl.
*F16H 3/62* (2006.01)
(52) U.S. Cl.
USPC .......................................... 475/277; 475/282
(58) Field of Classification Search
USPC ...................... 475/277, 282, 288, 311, 317
See application file for complete search history.

(56) References Cited

U.S. PATENT DOCUMENTS

| | | | |
|---|---|---|---|
| 7,597,646 B2 | 10/2009 | Kamm et al. | |
| 7,645,207 B2 | 1/2010 | Kamm et al. | |
| 7,682,282 B2 | 3/2010 | Kamm et al. | |
| 7,691,024 B2 | 4/2010 | Phillips et al. | |
| 7,785,225 B2 * | 8/2010 | Phillips et al. | 475/277 |
| 7,789,792 B2 | 9/2010 | Kamm et al. | |
| 7,980,985 B2 * | 7/2011 | Seo et al. | 475/275 |
| 7,980,986 B2 | 7/2011 | Kamm et al. | |
| 8,092,336 B2 | 1/2012 | Hart et al. | |
| 8,157,697 B2 | 4/2012 | Hart et al. | |
| 8,231,495 B2 | 7/2012 | Gumpoltsberger et al. | |
| 8,303,455 B2 | 11/2012 | Gumpoltsberger et al. | |
| 2008/0242496 A1 * | 10/2008 | Phillips et al. | 475/288 |
| 2010/0279814 A1 | 11/2010 | Brehmer et al. | |
| 2011/0245013 A1 | 10/2011 | Kim | |
| 2011/0294617 A1 | 12/2011 | Seo et al. | |
| 2011/0300987 A1 | 12/2011 | Diosi et al. | |
| 2011/0306460 A1 | 12/2011 | Haupt et al. | |

OTHER PUBLICATIONS

H. Benford, M. Leising, The Lever Analogy: A New Tool in Transmission Analysis, 1982, Society of Automotive Engineers, Inc. 810102, p. 429-437.

* cited by examiner

*Primary Examiner* — Edwin A Young
(74) *Attorney, Agent, or Firm* — James Dottavio; Brooks Kushman P.C.

(57) ABSTRACT

A family of transmissions produces at least eight forward and one reverse speed ratio by selective engagement of various combinations of three clutches or brakes. Each transmission includes two fixed gearing arrangements that establish fixed speed relationships between an input shaft, and output shaft, and four other elements. Specifically, the input shaft is constrained to rotate at a speed between that of the first and second elements while the output shaft is constrained to rotate at a speed between that of the third and fourth elements. Additional gearing, clutches, and brakes establish specified selective speed relationships among these elements.

27 Claims, 4 Drawing Sheets

MULTIPLE SPEED TRANSMISSION

TECHNICAL FIELD

This disclosure relates to the field of automatic transmissions for motor vehicles. More particularly, the disclosure pertains to an arrangement of gears, clutches, and the interconnections among them in a power transmission.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

A gearing arrangement is a collection of rotating elements and clutches configured to impose specified speed relationships among elements. Some speed relationships, called fixed speed relationships, are imposed regardless of the state of any clutches. A gearing arrangement imposing only fixed relationships is called a fixed gearing arrangement. Other speed relationships are imposed only when particular clutches are fully engaged. A gearing arrangement that selectively imposes speed relationships is called a shiftable gearing arrangement. A discrete ratio transmission has a shiftable gearing arrangement that selectively imposes a variety of speed ratios between an input shaft and an output shaft.

A group of elements are fixedly coupled to one another if they are constrained to rotate as a unit in all operating conditions. Elements may be fixedly coupled by spline connections, welding, press fitting, machining from a common solid, or other means. Slight variations in rotational displacement between fixedly coupled elements can occur such as displacement due to lash or shaft compliance. In contrast, two elements are selectively coupled by a clutch when the clutch constrains them to rotate as a unit whenever the clutch is fully engaged and they are free to rotate at distinct speeds in at least some other operating condition. Clutches include actively controlled devices such as hydraulically or electrically actuated clutches and passive devices such as one way clutches. A clutch that holds an element against rotation by selectively connecting the element to the housing may be called a brake. A group of elements are coupled if they are fixedly coupled or selectively coupled.

SUMMARY OF THE DISCLOSURE

A family of transmissions is disclosed. Each transmission includes an input shaft, an output shaft, a number of rotating elements, and gearing arrangements and clutches that impose specified fixed and selectable speed relationships.

In one embodiment, a transmission includes at least first, second, third, fourth, fifth, and sixth elements in addition to the input shaft and output shaft. A first gearing arrangement fixedly constrains the speed of the input shaft to be between the speeds of the first and second elements. The first gearing arrangement may be, for example, a simple planetary gear set having a sun gear as the second element, a planet carrier fixedly coupled to the input shaft, and a ring gear as the first element. A second gearing arrangement fixedly constrains the speed of the output shaft to be between the speeds of the third and fourth elements. The second gearing arrangement may be, for example, a simple planetary gear set having a sun gear as the third element, a planet carrier fixedly coupled to the output shaft, and a ring gear as the fourth element. A third gearing arrangement fixedly constrains the speed of the fifth element to be between zero and the speed the sixth element. The fifth element is coupled to the fourth element and the sixth element is coupled to the second element. The third gearing arrangement may be, for example, a simple planetary gear set having a sun gear as the sixth element fixedly coupled to the second element, a planet carrier as the fifth element selectively coupled to the fourth element, and a ring gear fixedly held against rotation. Alternatively, the third gearing arrangement may be, as another example, a simple planetary gear set having a sun gear selectively coupled to the second element, a planet carrier fixedly coupled to the fourth element, and a ring gear fixedly held against rotation. A fourth gearing arrangement selectively constrains the speed of the fourth element to be between the speeds of the first element and the third element. The fourth gearing arrangement may be, for example, a double pinion planetary gear set having a sun gear fixedly coupled to the third element, a planet carrier selectively coupled to the first element, and a ring gear fixedly coupled to the fourth element. Eight speed embodiments have clutches and brakes which selectively hold the second element against rotation, selectively couple the third element to the input shaft, and selectively couple the first element to the third element. Ten speed embodiments additionally have a clutch selectively coupling the first element to the fourth element.

In another embodiment, a transmission includes at least first, second, third, fourth, fifth, and sixth elements in addition to the input shaft and output shaft. A first gearing arrangement fixedly constrains the speed of the input shaft to be between the speeds of the first and second elements. The first gearing arrangement may be, for example, a simple planetary gear set having a sun gear as the second element, a planet carrier fixedly coupled to the input shaft, and a ring gear as the first element. A second gearing arrangement fixedly constrains the speed of the output shaft to be between the speeds of the third and fourth elements. The second gearing arrangement may be, for example, a simple planetary gear set having a sun gear as the third element, a planet carrier fixedly coupled to the output shaft, and a ring gear as the fourth element. A third gearing arrangement fixedly constrains the speed of the fourth element to be between the speeds of the fifth and sixth elements. The fifth element is coupled to the first element and the sixth element is coupled to the third element. The third gearing arrangement may be, for example, a double pinion planetary gear set having a sun gear as the sixth element fixedly coupled to the third element, a planet carrier as the fifth element selectively coupled to the first element, and a ring gear fixedly coupled to the fourth element. A fourth gearing arrangement selectively constrains the speed of the fourth element to be between zero and the speed the second element. The fourth gearing arrangement may be, for example, a simple planetary gear set having a sun gear selectively coupled to the second element by a clutch, a planet carrier fixedly coupled to the fourth element, and a ring gear fixedly held against rotation. Alternatively, the fourth gearing arrangement may be, as another example, a simple planetary gear set having a sun gear fixedly coupled to the second element, a planet carrier selectively coupled to the fourth element by a clutch, and a ring gear fixedly held against rotation. Eight speed embodiments have clutches and brakes which selectively hold the second element against rotation, selectively couple the third element to the input shaft, and selectively couple the first element to the third element. Ten speed embodiments additionally have a clutch selectively coupling the first element to the fourth element.

In another embodiment, a transmission includes at least first, second, third, fourth, fifth, sixth, and seventh elements in addition to the input shaft and output shaft. A first gearing arrangement fixedly constrains the speed of the input shaft to be between the speeds of the first and second elements. The first gearing arrangement may be, for example, a simple planetary gear set having a sun gear as the second element, a planet carrier fixedly coupled to the input shaft, and a ring gear as the first element. A second gearing arrangement fixedly constrains the speed of the output shaft to be between the speeds of the third and fourth elements. The second gearing arrangement may be, for example, a simple planetary gear set having a sun gear as the third element, a planet carrier fixedly coupled to the output shaft, and a ring gear as the fourth element. A third gearing arrangement fixedly constrains the speed of the seventh element to be between the speeds of the fifth and sixth elements. The fifth element is coupled to the first element, the sixth element is coupled to the third element, and the seventh element is coupled to the fourth element. The third gearing arrangement may be, for example, a double pinion planetary gear set having a sun gear as the sixth element fixedly coupled to the third element, a planet carrier as the fifth element selectively coupled to the first element, and a ring gear as the seventh element fixedly coupled to the fourth element. Alternatively, the third gearing arrangement may be, as another example, a double pinion planetary gear set having a sun gear as the sixth element fixedly coupled to the third element, a planet carrier as the fifth element fixedly coupled to the first element, and a ring gear as the seventh element selectively coupled to the fourth element. A fourth gearing arrangement selectively constrains the speed of the fourth element to be between zero and the speed the second element. The fourth gearing arrangement may be, for example, a simple planetary gear set having a sun gear fixedly coupled to the second element, a planet carrier fixedly coupled to the fourth element, and a ring gear selectively held against rotation. Alternatively, the fourth gearing arrangement may be, as another example, a simple planetary gear set having a sun gear fixedly coupled to the second element, a planet carrier selectively coupled to the fourth element by a clutch, and a ring gear fixedly held against rotation. Clutches and brakes selectively hold the second element against rotation, selectively couple the third element to the input shaft, selectively couple the first element to the third element, and selectively coupling the first element to the fourth element.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
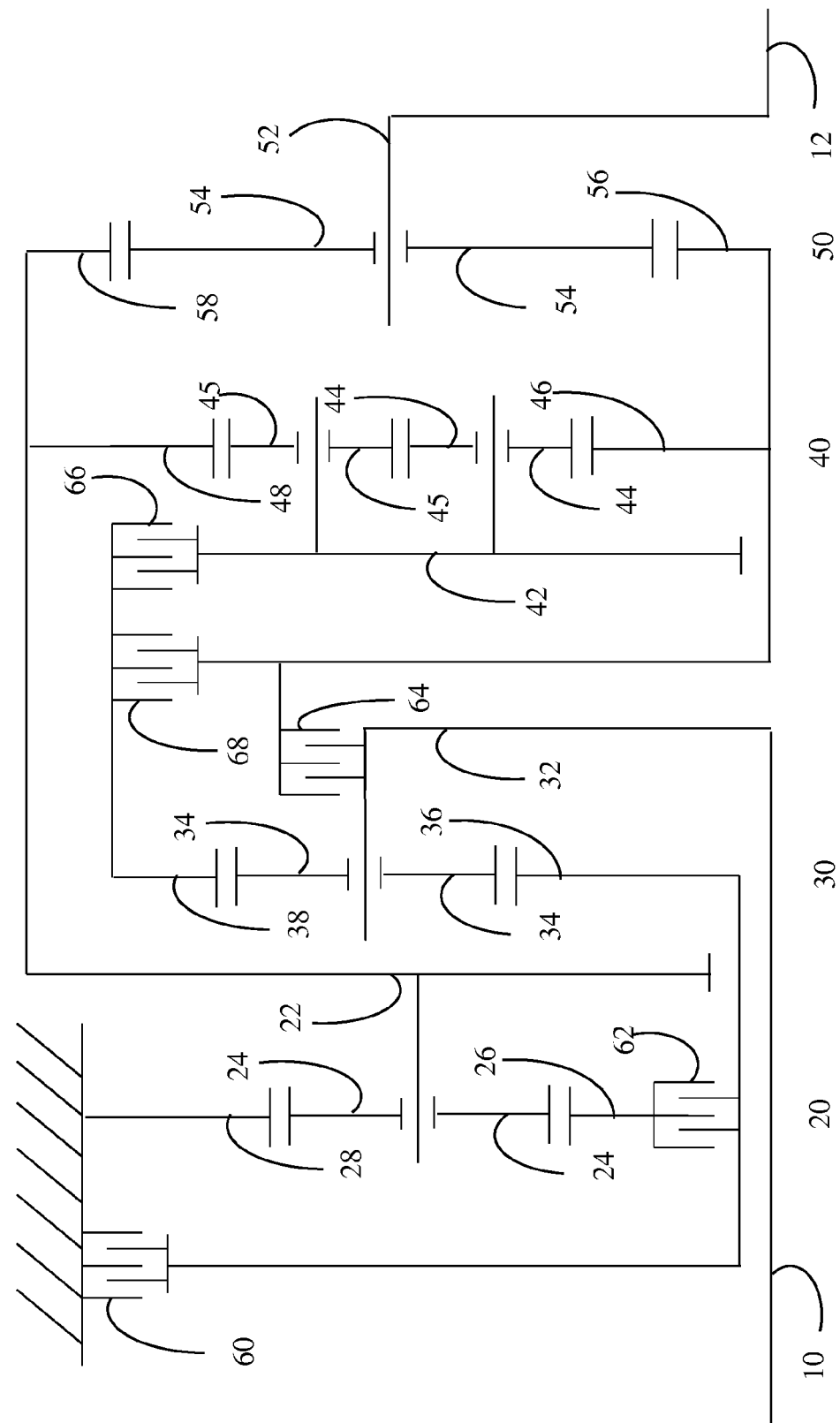
FIG. 1 is a schematic diagram of a first transmission gearing arrangement.

An example transmission is schematically illustrated in FIG. 1. The transmission utilizes four planetary gear sets 20, 30, 40, and 50. Gear sets 20, 30, and 50 are simple planetary gear sets. A simple planetary gear set is a type of fixed gearing arrangement. A planet carrier 22 rotates about a central axis and supports a set of planet gears 24 such that the planet gears rotate with respect to the planet carrier. External gear teeth on the planet gears mesh with external gear teeth on a sun gear 26 and with internal gear teeth on a ring gear 28. The sun gear and ring gear are supported to rotate about the same axis as the carrier. A simple planetary gear set imposes the fixed speed relationship that the speed of the carrier is between the speed of the sun gear and the speed of the ring gear. (This relationship is defined to include the condition in which all three rotate at the same speed.) More specifically, the speed of the carrier is a weighted average of the speed of the sun gear and the speed of the ring gear with weighting factors determined by the number of teeth on each gear.

Gear set 40 is a double pinion planetary gear set, which is another type of fixed gearing arrangement. A planet carrier 42 rotates about a central axis and supports an inner set of planet gears 44 and an outer set of planet gears 45. External gear teeth on each of the inner planet gears 44 mesh with external gear teeth on a sun gear 46 and with internal gear teeth on one of the outer planet gears 45. External gear teeth on each of the outer planet gears 45 mesh with internal gear teeth on a ring gear 48. The sun gear and ring gear are supported to rotate about the same axis as the carrier. A double pinion planetary gear set imposes the fixed speed relationship that the speed of the ring gear is between the speed of the sun gear and the speed of the carrier. (This relationship is defined to include the condition in which all three rotate at the same speed.) More specifically, the speed of the ring gear is a weighted average of the speed of the sun gear and the speed of the carrier with weighting factors determined by the number of teeth on each gear. Similar speed relationships are imposed by other known types of fixed gearing arrangements.

A suggested ratio of gear teeth for each planetary gear set in FIG. 1 is listed in Table 1.

TABLE 1

| | |
|---|---|
| Ring 28/Sun 26 | 2.40 |
| Ring 38/Sun 36 | 2.20 |
| Ring 48/Sun 46 | 2.10 |
| Ring 58/Sun 56 | 3.80 |

Input shaft 10 is fixedly coupled to carrier 32. Output shaft 12 is fixedly coupled to carrier 52. Carrier 22, ring gear 48, and ring gear 58 are fixedly coupled to one another. Ring gear 28 is fixedly held against rotation. Sun gear 46 is fixedly coupled to sun gear 56. Sun gear 36 is selectively held against rotation by brake 60 and selectively coupled to sun gear 26 by clutch 62. Sun gear 46 and sun gear 56 are selectively coupled to input shaft 10 and carrier 32 by clutch 64. Ring gear 38 is selectively coupled to carrier 42 by clutch 66 and selectively coupled to sun gear 46 and sun gear 56 by clutch 68.

As shown in Table 2, engaging the clutches and brakes in combinations of three establishes eight forward speed ratios and one reverse speed ratio between input shaft 10 and output shaft 12. An X indicates that the clutch is engaged to establish the speed ratio. All shifts between adjacent speed ratios and all two step shifts can be accomplished by the coordinated release of one clutch or brake and the engagement of one other clutch or brake. When the gear sets of FIG. 1 have tooth numbers as indicated in Table 1, the speed ratios have the values indicated in Table 2.

TABLE 2

|  | 60 | 62 | 64 | 66 | 68 | Ratio | Step |
|---|---|---|---|---|---|---|---|
| Rev | X | X |  | X |  | −3.00 | 63% |
| $1^{st}$ | X | X | X |  |  | 4.80 |  |
| $2^{nd}$ | X | X |  |  | X | 3.30 | 1.45 |
| $3^{rd}$ |  | X | X |  | X | 2.27 | 1.46 |
| $4^{th}$ |  | X |  | X | X | 1.75 | 1.30 |
| $5^{th}$ |  | X | X | X |  | 1.33 | 1.31 |
| $6^{th}$ |  |  | X | X | X | 1.00 | 1.33 |
| $7^{th}$ | X |  | X | X |  | 0.84 | 1.19 |
| $8^{th}$ | X |  |  | X | X | 0.69 | 1.22 |

Figure 2:
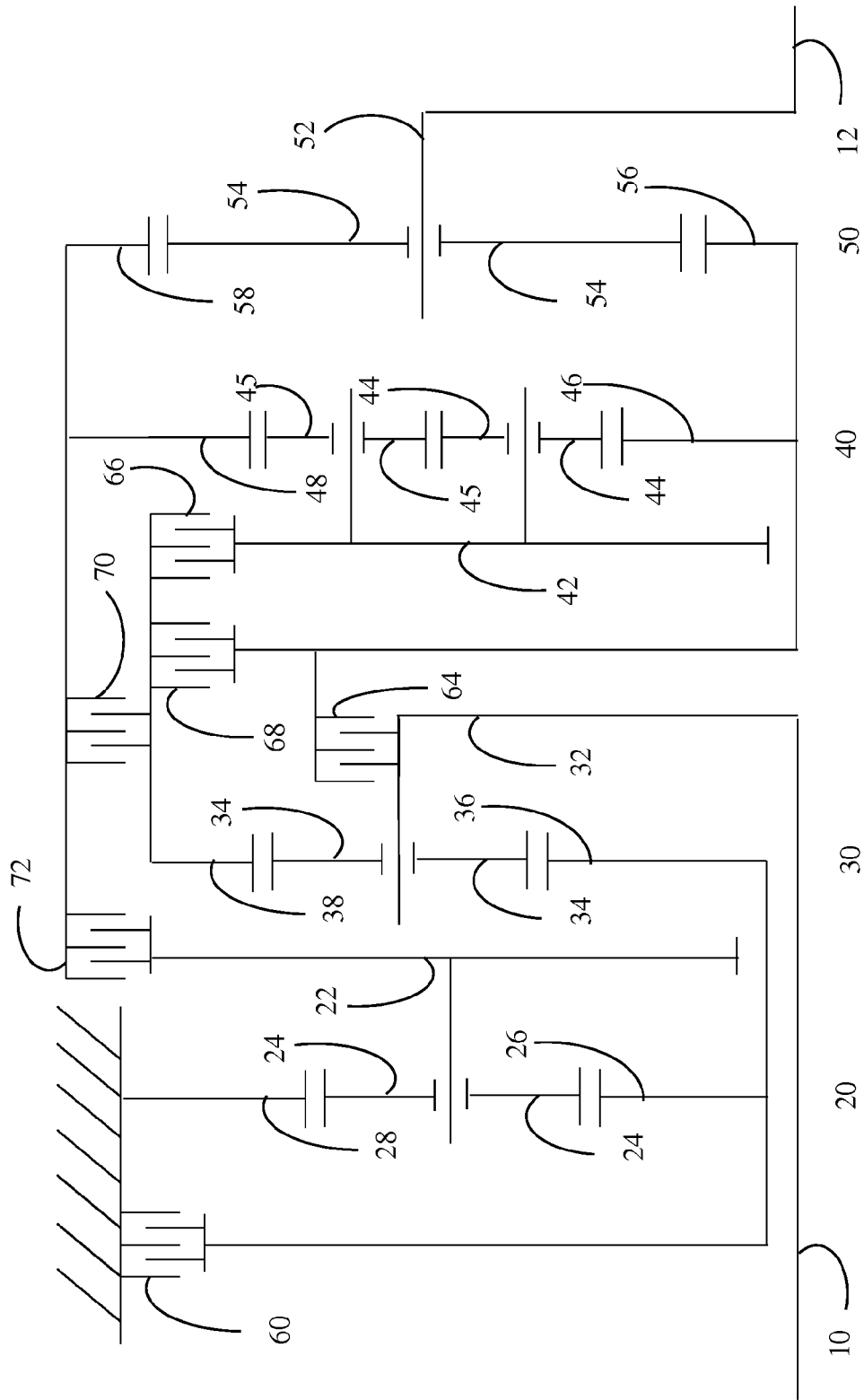
FIG. 2 is a schematic diagram of a second transmission gearing arrangement.

Another example transmission is illustrated in FIG. 2. The transmission utilizes three simple planetary gear sets 20, 30, and 50 and one double pinion planetary gear set 40. A suggested ratio of gear teeth for each planetary gear set in FIG. 2 is listed in Table 3.

TABLE 3

| Ring 28/Sun 26 | 2.40 |
|---|---|
| Ring 38/Sun 36 | 1.80 |
| Ring 48/Sun 46 | 1.90 |
| Ring 58/Sun 56 | 3.80 |

Input shaft 10 is fixedly coupled to carrier 32. Output shaft 12 is fixedly coupled to carrier 52. Ring gear 48 is fixedly coupled to ring gear 58. Ring gear 28 is fixedly held against rotation. Sun gear 26 is fixedly coupled to sun gear 36. Sun gear 46 is fixedly coupled to sun gear 56. Sun gear 26 and sun gear 36 are selectively held against rotation by brake 60. Sun gear 46 and sun gear 56 are selectively coupled to input shaft 10 and carrier 32 by clutch 64. Ring gear 38 is selectively coupled to carrier 42 by clutch 66, selectively coupled to sun gear 46 and sun gear 56 by clutch 68, and selectively coupled to ring gear 48 and ring gear 58 by clutch 70. Carrier 22 is selectively coupled to ring gear 48 and ring gear 58 by clutch 72.

As shown in Table 4, engaging the clutches and brakes in combinations of three establishes ten forward speed ratios and one reverse speed ratio between input shaft 10 and output shaft 12. When the gear sets of FIG. 2 have tooth numbers as indicated in Table 3, the speed ratios have the values indicated in Table 4.

TABLE 4

|  | 60 | 64 | 66 | 68 | 70 | 72 | Ratio | Step |
|---|---|---|---|---|---|---|---|---|
| Rev | X |  | X |  |  | X | −3.43 | 71% |
| $1^{st}$ | X | X |  |  |  | X | 4.80 |  |
| $2^{nd}$ | X |  |  | X |  | X | 3.09 | 1.56 |
| $3^{rd}$ |  | X |  | X |  | X | 2.27 | 1.36 |
| $4^{th}$ |  |  |  | X | X | X | 1.86 | 1.22 |
| $5^{th}$ |  | X |  |  | X | X | 1.58 | 1.18 |
| $6^{th}$ |  | X | X |  |  | X | 1.36 | 1.16 |
| $7^{th}$ |  |  | X | X | X |  | 1.00 | 1.36 |
| $8^{th}$ | X | X | X |  |  |  | 0.83 | 1.21 |
| $9^{th}$ | X | X |  |  | X |  | 0.70 | 1.20 |
| $10^{th}$ | X |  | X |  | X |  | 0.64 | 1.08 |

All shifts between adjacent speed ratios can be accomplished by the coordinated release of one clutch or brake and the engagement of one other clutch or brake. Similar, all two step shifts except $4^{th}$ to $6^{th}$ and many of the three step shifts can be accomplished by the coordinated release of one friction element and engagement of one other friction element. Additional shift are possible by utilizing alternate combinations of clutches for certain speed ratios. Specifically, $4^{th}$ gear can be established by engaging clutch 72 while engaging any two of clutches 66, 68, and 70. Similarly, $7^{th}$ gear can be established by engaging clutch 64 while engaging any two of clutches 66, 68, and 70 and $10^{th}$ gear can be established by engaging brake 60 while engaging any two of clutches 66, 68, and 70. For example, a shift from $4^{th}$ gear to $6^{th}$ gear can be accomplished by engaging clutch 66, then releasing clutch 68, and then coordinating the release of clutch 70 with the engagement of clutch 64.

Figure 3:
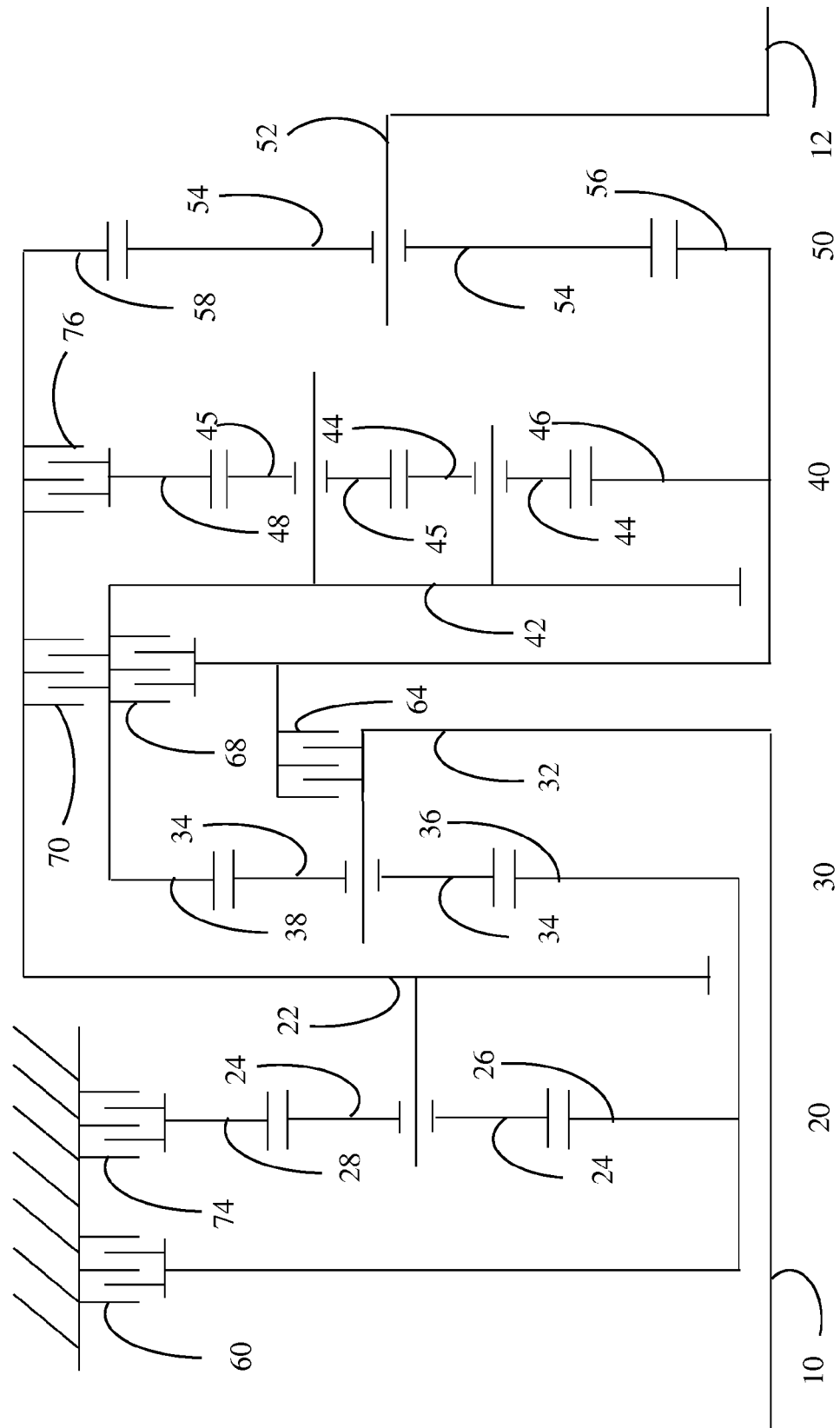
FIG. 3 is a schematic diagram of a third transmission gearing arrangement.

A third example transmission is illustrated in FIG. 3. The transmission utilizes three simple planetary gear sets 20, 30, and 50 and one double pinion planetary gear set 40. Input shaft 10 is fixedly coupled to carrier 32. Output shaft 12 is fixedly coupled to carrier 52. Carrier 22 is fixedly coupled to ring gear 58. Sun gear 26 is fixedly coupled to sun gear 36. Ring gear 38 is fixedly coupled to carrier 42. Sun gear 46 is fixedly coupled to sun gear 56. Brake 60 selectively holds sun gear 26 and sun gear 36 against rotation. Sun gear 46 and sun gear 56 are selectively coupled to input shaft 10 and carrier 32 by clutch 64 and selectively coupled to ring gear 38 and carrier 42 by clutch 68. Carrier 22 and ring gear 58 are selectively coupled to ring gear 38 and carrier 42 by clutch 70 and selectively coupled to ring gear 48 by clutch 76. Brake 74 selectively holds ring gear 28 against rotation.

As shown in Table 5, engaging the clutches and brakes in combinations of three establishes ten forward speed ratios and one reverse speed ratio between input shaft 10 and output shaft 12. When the gear sets of FIG. 3 have tooth numbers as indicated in Table 3, the speed ratios have the values indicated in Table 5.

TABLE 5

|  | 60 | 64 | 68 | 70 | 74 | 76 | Ratio | Step |
|---|---|---|---|---|---|---|---|---|
| Rev | X |  |  |  | X | X | −3.43 | 71% |
| $1^{st}$ | X | X |  |  | X |  | 4.80 |  |
| $2^{nd}$ | X |  | X |  | X |  | 3.09 | 1.56 |
| $3^{rd}$ |  | X | X |  | X |  | 2.27 | 1.36 |
| $4^{th}$ |  |  | X | X | X |  | 1.86 | 1.22 |
| $5^{th}$ |  | X |  | X | X |  | 1.58 | 1.18 |
| $6^{th}$ |  | X |  |  | X | X | 1.36 | 1.16 |
| $7^{th}$ |  | X |  | X |  | X | 1.00 | 1.36 |
| $8^{th}$ | X | X |  |  |  | X | 0.83 | 1.21 |
| $9^{th}$ | X | X |  | X |  |  | 0.70 | 1.20 |
| $10^{th}$ | X |  |  | X |  | X | 0.64 | 1.08 |

Figure 4:
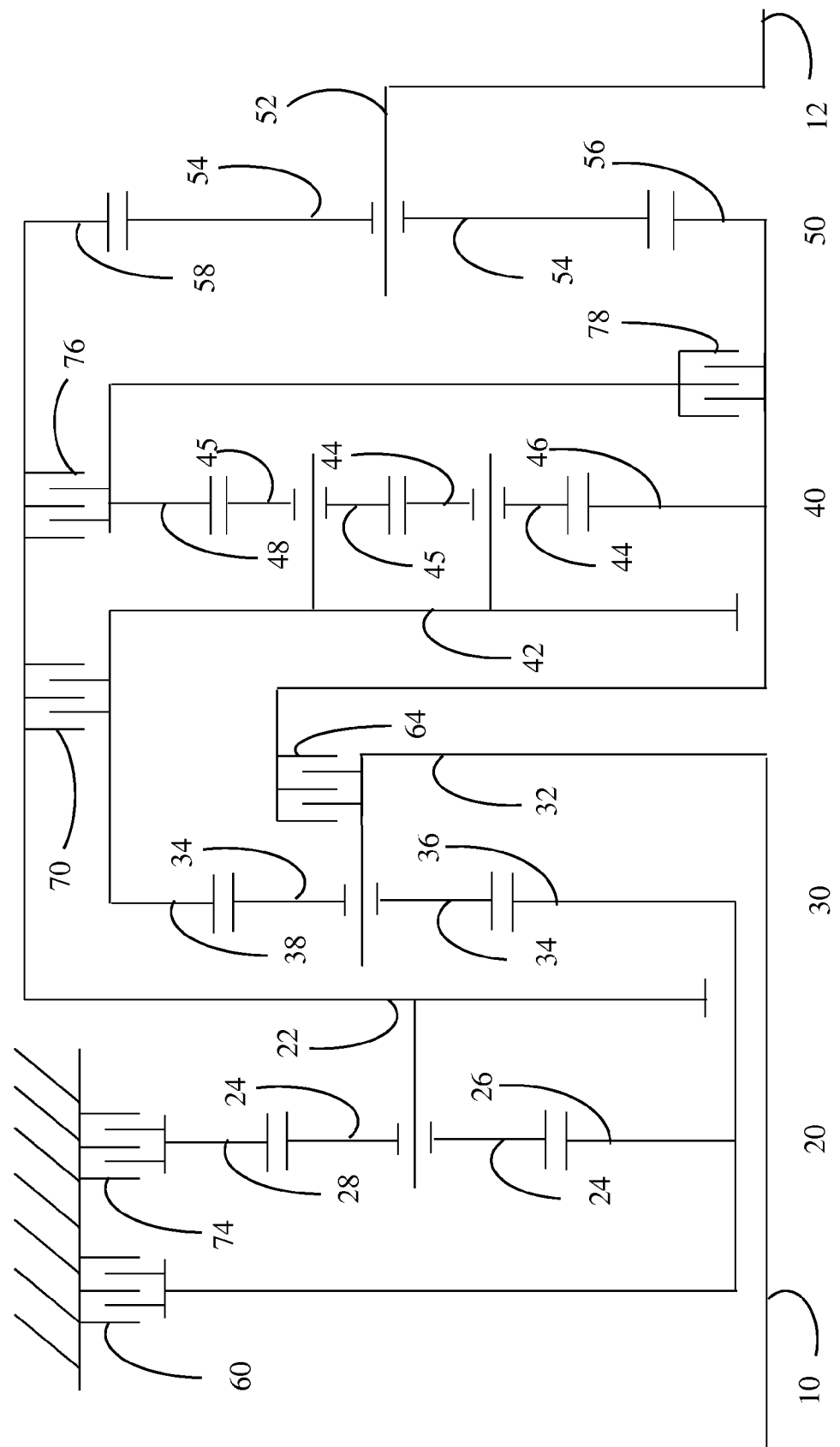
FIG. 4 is a schematic diagram of a fourth transmission gearing arrangement.

A fourth example transmission is illustrated in FIG. 4. The transmission utilizes three simple planetary gear sets 20, 30, and 50 and one double pinion planetary gear set 40. Input shaft 10 is fixedly coupled to carrier 32. Output shaft 12 is fixedly coupled to carrier 52. Carrier 22 is fixedly coupled to ring gear 58. Sun gear 26 is fixedly coupled to sun gear 36. Ring gear 38 is fixedly coupled to carrier 42. Sun gear 46 is fixedly coupled to sun gear 56. Brake 60 selectively holds sun gear 26 and sun gear 36 against rotation. Sun gear 46 and sun gear 56 are selectively coupled to input shaft 10 and carrier 32 by clutch 64 and selectively coupled to ring gear 48 by clutch 78. Carrier 22 and ring gear 58 are selectively coupled to ring gear 38 and carrier 42 by clutch 70 and selectively coupled to ring gear 48 by clutch 76. Brake 74 selectively holds ring gear 28 against rotation.

When clutch 78 is engaged, all members of gear set 40 are forced to rotate as a single unit. Consequently, because ring gear 38 is fixedly coupled to carrier 42 and sun gear 56 is fixedly coupled to sun gear 46, engaging clutch 78 operatively couples ring gear 38 to sun gear 56 even though it does not directly couple these two elements.

As shown in Table 6, engaging the clutches and brakes in combinations of three establishes ten forward speed ratios and one reverse speed ratio between input shaft 10 and output shaft 12. When the gear sets of FIG. 4 have tooth numbers as indicated in Table 3, the speed ratios have the values indicated in Table 6.

TABLE 5

|  | 60 | 64 | 70 | 74 | 76 | 78 | Ratio | Step |
|---|---|---|---|---|---|---|---|---|
| Rev | X |  |  | X | X |  | −3.43 | 71% |
| 1$^{st}$ | X | X |  | X |  |  | 4.80 |  |
| 2$^{nd}$ | X |  |  | X |  | X | 3.09 | 1.56 |
| 3$^{rd}$ |  | X |  | X |  | X | 2.27 | 1.36 |
| 4$^{th}$ |  |  | X | X |  | X | 1.86 | 1.22 |
| 5$^{th}$ |  | X | X | X |  |  | 1.58 | 1.18 |
| 6$^{th}$ |  | X |  | X | X |  | 1.36 | 1.16 |
| 7$^{th}$ |  | X | X |  | X |  | 1.00 | 1.36 |
| 8$^{th}$ | X | X |  |  | X |  | 0.83 | 1.21 |
| 9$^{th}$ | X | X | X |  |  |  | 0.70 | 1.20 |
| 10$^{th}$ | X |  | X |  | X |  | 0.64 | 1.08 |

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A transmission comprising:
    an input shaft;
    an output shaft;
    a first fixed gearing arrangement configured to fixedly constrain the input shaft to rotate at a speed between speeds of a first element and a second element;
    a second fixed gearing arrangement configured to fixedly constrain the output shaft to rotate at a speed between speeds of a third element and a fourth element;
    a third fixed gearing arrangement configured to fixedly constrain a fifth element to rotate at a speed between zero and a speed of a sixth element, wherein the fifth element is coupled to the fourth element and the sixth element is coupled to the second element; and
    a first shiftable gearing arrangement configured to selectively constrain the fourth element to rotate at a speed between speeds of the first element and the third element.

2. The transmission of claim 1 further comprising:
    a first brake selectively holding the second element against rotation;
    a first clutch selectively coupling the third element to the input shaft; and
    a second clutch selectively coupling the first element to the third element.

3. The transmission of claim 2 further comprising a third clutch selectively coupling the first element to the fourth element.

4. The transmission of claim 1 wherein the first fixed gearing arrangement comprises a simple planetary gear set having a sun gear as the second element, a planet carrier fixedly coupled to the input shaft, a ring gear as the first element, and a plurality of planet gears supported for rotation relative to the planet carrier and in continuous meshing engagement with both the sun gear and the ring gear.

5. The transmission of claim 1 wherein the second fixed gearing arrangement comprises a simple planetary gear set having a sun gear as the third element, a planet carrier fixedly coupled to the output shaft, a ring gear as the fourth element, and a plurality of planet gears supported for rotation relative to the planet carrier and in continuous meshing engagement with both the sun gear and the ring gear.

6. The transmission of claim 1 wherein the third fixed gearing arrangement comprises a simple planetary gear set having a sun gear fixedly coupled to the second element, a planet carrier selectively coupled to the fourth element, a ring gear fixedly held against rotation, and a plurality of planet gears supported for rotation relative to the planet carrier and in continuous meshing engagement with both the sun gear and the ring gear.

7. The transmission of claim 1 wherein the third fixed gearing arrangement comprises a simple planetary gear set having a sun gear selectively coupled to the second element, a planet carrier fixedly coupled to the fourth element, a ring gear fixedly held against rotation, and a plurality of planet gears supported for rotation relative to the planet carrier and in continuous meshing engagement with both the sun gear and the ring gear.

8. The transmission of claim 1 wherein the first shiftable gearing arrangement comprises a double pinion planetary gear set having a sun gear fixedly coupled to the third element, a planet carrier selectively coupled to the first element, a ring gear fixedly coupled to the fourth element, a plurality of inner planet gears supported for rotation relative to the planet carrier and in continuous meshing engagement with the sun gear, and a plurality of outer planet gears supported for rotation relative to the carrier, each outer planet gear in continuous meshing engagement with both an inner planet gear and the ring gear.

9. A transmission comprising:
an input shaft;
an output shaft;
a first fixed gearing arrangement configured to fixedly constrain the input shaft to rotate at a speed between speeds of a first element and a second element;
a second fixed gearing arrangement configured to fixedly constrain the output shaft to rotate at a speed between speeds of a third element and a fourth element;
a third fixed gearing arrangement configured to fixedly constrain the fourth element to rotate at a speed between speeds of a fifth element and a sixth element, wherein the fifth element is coupled to the first element and the sixth element is coupled to the third element; and
a first shiftable gearing arrangement configured to selectively constrain the fourth element to rotate at a speed between zero and a speed of the second element.

10. The transmission of claim 9 further comprising:
a first brake selectively holding the second element against rotation;
a first clutch selectively coupling the third element to the input shaft; and
a third clutch selectively coupling the first element to the third element.

11. The transmission of claim 9 further comprising a fourth clutch selectively coupling the first element to the fourth element.

12. The transmission of claim 9 wherein the first fixed gearing arrangement comprises a simple planetary gear set having a sun gear as the second element, a planet carrier fixedly coupled to the input shaft, a ring gear as the first element, and a plurality of planet gears supported for rotation relative to the planet carrier and in continuous meshing engagement with both the sun gear and the ring gear.

13. The transmission of claim 9 wherein the second fixed gearing arrangement comprises a simple planetary gear set having a sun gear as the third element, a planet carrier fixedly coupled to the output shaft, a ring gear as the fourth element, and a plurality of planet gears supported for rotation relative to the planet carrier and in continuous meshing engagement with both the sun gear and the ring gear.

14. The transmission of claim 9 wherein the third fixed gearing arrangement comprises a double pinion planetary gear set having a sun gear as the sixth element, a planet carrier as the fifth element, a ring gear fixedly coupled to the fourth element, a first plurality of planet gears supported for rotation relative to the planet carrier and in continuous meshing engagement with the sun gear, and a second plurality of planet gears supported for rotation relative to the planet carrier and in continuous meshing engagement with both the first planet gears and the ring gear.

15. The transmission of claim 14 wherein:
the sun gear is fixedly coupled to the third element; and
a second clutch selectively couples the planet carrier to the first element.

16. The transmission of claim 9 wherein the first shiftable gearing arrangement comprises:
a simple planetary gear set having a sun gear, a planet carrier fixedly coupled to the fourth element, a ring gear fixedly held against rotation, and a plurality of planet gears supported for rotation relative to the planet carrier and in continuous meshing engagement with both the sun gear and the ring gear; and
a fifth clutch selectively coupling the sun gear to the second element.

17. The transmission of claim 9 wherein the first shiftable gearing arrangement comprises:
a simple planetary gear set having a sun gear fixedly coupled to the second element, a planet carrier, a ring gear fixedly held against rotation, and a plurality of planet gears supported for rotation relative to the planet carrier and in continuous meshing engagement with both the sun gear and the ring gear; and
a fifth clutch selectively coupling the planet carrier to the fourth element.

18. A transmission comprising:
an input shaft;
an output shaft;
a first fixed gearing arrangement configured to fixedly constrain the input shaft to rotate at a speed between speeds of a first element and a second element;
a second fixed gearing arrangement configured to fixedly constrain the output shaft to rotate at a speed between speeds of a third element and a fourth element;
a third fixed gearing arrangement configured to fixedly constrain a seventh element to rotate at a speed between speeds of a fifth element and a sixth element, wherein the fifth element is coupled to the first element, the seventh element is coupled to the fourth element, and the sixth element is coupled to the third element;
a first shiftable gearing arrangement configured to selectively constrain the fourth element to rotate at a speed between zero and a speed of the second element;
a first brake selectively holding the second element against rotation;
a first clutch selectively coupling the third element to the input shaft;
a third clutch selectively coupling the first element to the third element; and
a fourth clutch selectively coupling the first element to the fourth element.

19. The transmission of claim 18 wherein the first fixed gearing arrangement comprises a simple planetary gear set having a sun gear as the second element, a planet carrier fixedly coupled to the input shaft, a ring gear as the first element, and a plurality of planet gears supported for rotation relative to the planet carrier and in continuous meshing engagement with both the sun gear and the ring gear.

20. The transmission of claim 18 wherein the second fixed gearing arrangement comprises a simple planetary gear set having a sun gear as the third element, a planet carrier fixedly coupled to the output shaft, a ring gear as the fourth element, and a plurality of planet gears supported for rotation relative to the planet carrier and in continuous meshing engagement with both the sun gear and the ring gear.

21. The transmission of claim 18 wherein the third fixed gearing arrangement comprises a double pinion planetary gear set having a sun gear as the sixth element, a planet carrier as the fifth element, a ring gear as the seventh element, a first plurality of planet gears supported for rotation relative to the planet carrier and in continuous meshing engagement with the sun gear, and a second plurality of planet gears supported for rotation relative to the planet carrier and in continuous meshing engagement with both the first planet gears and the ring gear.

22. The transmission of claim 21 wherein:
the sun gear is fixedly coupled to the third element;
the ring gear is fixedly coupled to the fourth element; and
a second clutch selectively couples the planet carrier to the first element.

23. The transmission of claim 21 wherein:
the sun gear is fixedly coupled to the third element;
the planet carrier is fixedly coupled to the first element; and
a second clutch selectively couples the ring gear to the fourth element.

24. The transmission of claim 18 wherein the first shiftable gearing arrangement comprises:
a simple planetary gear set having a sun gear fixedly coupled to the second element, a planet carrier, a ring gear fixedly held against rotation, and a plurality of planet gears supported for rotation relative to the planet carrier and in continuous meshing engagement with both the sun gear and the ring gear; and
a fifth clutch selectively coupling the planet carrier to the fourth element.

25. The transmission of claim 18 wherein the first shiftable gearing arrangement comprises:
a simple planetary gear set having a sun gear fixedly coupled to the second element, a planet carrier fixedly coupled to the fourth element, a ring gear, and a plurality of planet gears supported for rotation relative to the planet carrier and in continuous meshing engagement with both the sun gear and the ring gear; and
a second brake selectively holding the ring gear against rotation.

26. The transmission of claim 18 wherein the third clutch selectively directly couples the first element to the third element.

27. The transmission of claim 18 wherein:
the first element is fixedly coupled to the fifth element;
the third element is fixedly coupled to the sixth element; and
the third clutch selectively directly couples two of the fifth element, the sixth element, and the seventh element.

* * * * *